UNITED STATES PATENT OFFICE

2,581,917
ISOBORNYL ARYL ETHERS

Leland J. Kitchen, Akron, Ohio, assignor to The Firestone Tire & Rubber Company, Akron, Ohio, a corporation of Ohio No Drawing. Application February 21, 1948,
Serial No. 10,185

6 Claims. (Cl. 260—612)

This invention relates to isobornyl aryl ethers. The compounds are useful intermediates for the preparation of stabilizers, as, for example, for the stabilization of natural and synthetic rubbers.

The new compounds include isobornyl ethers of unsubstituted and substituted phenols. The terpene employed will be camphene or tricyclene. The phenol will ordinarily be unsubstituted or alkyl-substituted (normal, branched chain or alicyclic) having from one up through eighteen or more carbon atoms; but the invention is not restricted to derivatives of such phenols but includes ethers of phenols having substituents such as, for example: halogen such as chlorine, bromine, iodine, fluorine; alkoxy such as methoxy, ethoxy, propoxy, isopropoxy, etc.; nitroso, phenyl, phenoxy and other substituted phenols, etc. Long-chain substituents in the ortho position present steric hindrance so that if a phenol containing an ortho alkyl substituent is employed ordinarily alkyl substituents containing no more than 4 or 5 carbon atoms will be used. However, the invention includes the ethers obtained from all alkyl-substituted phenols, regardless of the length of the side chain and regardless of the number of substituents. Thus a side chain, if in the meta or para position, may have up to about 18 carbon atoms, such as pentadecyl and octadecyl. Although ordinarily the ethers will be derived from monocyclic phenol, the invention includes ethers produced from naphthols, hydroquinone, catechol, and resorcinol, both substituted and unsubstituted.

The invention relates more particularly to the ethers obtained from unsubstituted camphene and unsubstituted tricyclene, and unsubstituted or alkyl-substituted phenols. Whether reacted with camphene or tricyclene the isobornyl ether of the corresponding phenol is obtained. High yields are obtained if the reaction is carried out at low temperatures.

The phenols which may be used in producing the ethers include

Phenol
p-Cresol
o-Cresol
2,4-dimethylphenol
2,6-dimethylphenol
4-chlorophenol
2,4-dichlorophenol
4-bromophenol
2-bromophenol
2,4-dibromophenol
2-methyl,4-chlorophenol
4-fluorophenol
4-methoxyphenol
4-nitrophenol
Beta-naphthol
Hydroquinone
Catechol
4-tert-amylphenol
2-ethoxyethoxyphenol
4-ethylphenol The terpenes which may be used in producing the ethers include camphene and tricyclene.

The following examples illustrate how the new compounds may be made. The boronfluoride catalyst referred to in the following examples consisted of 45 per cent of boron trifluoride in ether.

EXAMPLE 1
Isobornyl phenyl ether 272 grams of camphene was mixed with 188 grams of phenol. To the stirred mixture maintained at a temperature between $-1$ and $+15°$ C. was added 6.5 grams of $BF_3$ (45 per cent solution in ether). In 120 minutes the reaction was stopped by addition of aqueous alkali. Distillation yielded phenyl isobornyl ether, a water-white liquid with a faint odor, which was obtained in 82 per cent yield. The isobornyl phenyl ether had the following properties: B. P. 151° C./10 mm., 167° C./20 mm., 295° C./744 mm.; $n_D^{20}=1.5265$, $n_D^{25}=1.5241$, $n_D^{30}=1.5221$; $d_4^{20}=1.0058$; $M_D=70.36$ (calcd., 69.73).

EXAMPLE 2
Isobornyl o-tolyl ether

A mixture of 136 grams camphene and 122 grams o-cresol, stirred and cooled to $-5°$ to $10°$ C. was treated with 2 ml. of $BF_3$-ether catalyst during thirty minutes. A few minutes later the mixture crystallized to a mushy solid. After an hour the solid was shaken with NaOH solution and petroleum ether. The oil layer, distilled, yielded isobornyl o-tolyl ether in 88 per cent yield. The product, a colorless liquid with a very slight odor, had B. P. 164.5° C./10 mm. and $n_D^{20}=1.5274$ (supercooled liquid); it crystallized when cooled. Recrystallized from acetone, it had M. P. 48.5–48.8° C.

Analysis: Calcd. for $C_{17}H_{24}O$: C, 83.55%; H, 9.90%. Found: C, 83.73%; H, 10.03%.

EXAMPLE 3
Isobornyl p-tolyl ether 220 grams of p-cresol was mixed with 214 grams of camphene and 9 grams of $BF_3$ (45 per cent ether solution). The reaction mixture was kept below 10° C. for eleven days. A somewhat viscous liquid with a light-yellow tinge and a slight odor was obtained in a yield of 95 per cent. The isobornyl p-tolyl ether had the following properties: B. P. 164.5° C./10 mm.; $n_D^{20}=1.5190$; $d_4^{20}=0.9833$; $M_D=75.43$ (Calcd., 74.35).

EXAMPLE 4

Isobornyl 2,4-dimethylphenyl ether

A solution of camphene dissolved in an equivalent amount of 2,4-dimethylphenol (Tech. grade with a melting point of 18 to 20.5° C.) was treated with 2 per cent of benzene sulfonic acid (70 per cent) at a temperature of 0 to 5° C. and allowed to stand for several days. The yield was 95 to 98 per cent. Isobornyl 2,4-dimethylphenyl ether has a boiling point of 154° C./3 mm., or 176° C./10 mm. On recrystallization from 3:1 alcohol-acetone it had a melting point of 57.6–57.8° C.: $n_D^{23}=1.5230$ (super cooled liquid).

Analysis: Calcd. for $C_{18}H_{26}O$: C, 83.66%; H, 10.14%; M. W., 258.39. Found: C, 83.55%; H. 10.42%; M. W., 255 (micro-Rast).

EXAMPLE 5

Isobornyl 3,5-dimethylphenyl ether 136 grams of camphene and 122 grams of 3,5-dimethylphenol were mixed with 3 grams of $BF_3$ (45 per cent solution in ether) in 100 ml. toluene at −3 to +5° C. On completion of the reaction a yield of 84 per cent of isobornyl 3,5-dimethylphenyl ether was obtained from the reaction mixture. The product was a colorless liquid with a peculiar odor. Identifying characteristics were found to be: B. P. 173.5° C/10 mm.; $n_D^{20}=1.5240$; $d_4^{20}=0.9843$; $M_D=80.32$ (Calcd., 78.96).

EXAMPLE 6

Isobornyl p-methoxylphenyl ether

Equal molecular proportions of camphene and p-methoxyphenol were reacted with about 1 per cent of $BF_3$ (45 per cent solution in ether) as catalyst. The temperature was not allowed to rise about 5 to 10° C. After one hundred forty-five minutes the reaction mixture was worked up in the manner described in the previous examples. A yield of 85 per cent was obtained. The product is characterized by the following: B. P. 183° C/10 mm.; $n_D^{20}=1.5278$; $d_4^{20}=1.0388$ (super cooled); $M_D=77.15$ (Calcd., 75.99); M. P. 35.6–36.1° C. (alcohol).

Analysis: Calcd. for $C_{17}H_{24}O_2$: C, 78.42%; H, 9.29%. Found: C, 78.40%; H, 9.39%.

EXAMPLE 7

Isobornyl p-fluorophenyl ether 18 grams camphene and 11.8 grams p-fluorophenol were dissolved in 50 ml. petroleum ether. The solution was cooled to −5 to −10° C. and 0.5 ml. $BF_3$ (45 per cent solution) was added with stirring over a period of 90 minutes. The reaction mixture was washed with sodium hydroxide solution and then distilled. The yield was 86 per cent of isobornyl p-fluorophenyl ether, a colorless liquid with a boiling point of 151° C./10 mm.; $n_D^{20}=1.5111$; $d_4^{20}=1.044$; $M_D=71.25$ (Calcd., 70.97).

EXAMPLE 8

Isobornyl p-tert-amylphenyl ether 136 grams camphene and 164 grams p-tert-amylphenol, mixed with 400 ml. benzene-petroleum ether were cooled to 0–10° C. and stirred while 2 ml. of $BF_3$-ether catalyst was added during thirty minutes; the mushy solid present dissolved. Ninety minutes later the reaction mixture was washed with hot 5 per cent NaOH solution. Distillation yielded 252 grams (84 per cent yield) of isobornyl p-tert-amylphenyl ether, B. P. mainly 199° C./10 mm., a viscous colorless liquid of refractive index $n_D^{20}=1.5188$ and density $d_4^{20}=0.9698$, which crystallized to a mush on standing. Recrystallized from alcohol, it had M. P. 48.8–49.2° C.

Analysis: Calcd. for $C_{21}H_{32}O$: C, 83.94%; H, 10.74%. Found: C, 84.15%; H, 10.91%.

EXAMPLE 9

Isobornyl 2,4-dichlorophenyl ether 163 grams 2,4-dichlorophenol and 136 grams camphene, dissolved in 200 ml. benzene-carbon tetrachloride, were cooled to 0° C. 5 ml. $BF_3$-ether catalyst was added to the stirred, cooled mixture during sixty minutes; solid 2,4-dichlorophenol which had crystallized out soon dissolved. Three hours after the initial catalyst addition the reaction was stopped by addition of NaOH solution. The reaction mixture yielded 77 per cent isobornyl 2,4-dichlorophenyl ether, which distilled as a somewhat viscous colorless liquid, boiling point 195.5° C/10 mm., $n_D^{20}=1.5480$, $d_4^{20}=1.167$ (supercooled liquid), $M_D=81.45$ (Calcd., 70.97), which soon crystallized to a white solid. Recrystallized from petroleum ether, M. P. 61.0–61.4° C.

Analysis: Calcd. for $C_{16}H_{20}OCl_2$: C, 64.22%; H, 6.74%; Cl, 23.70%. Found: C, 63.90%; H, 6.88%; Cl, 23.72%.

EXAMPLE 10

Isobornyl phenyl ether

A mixture of ten moles each of phenol and camphene along with 2 grams of catalyst (70 per cent benzenesulfonic acid) was heated at 105° for sixteen hours. Six hundred milliliters of toluene were added to reduce the viscosity; and the mixture was washed with potassium carbonate solution and with water, dried over anhydrous $K_2CO_3$ and distilled. Besides solvent and unchanged starting materials, the following products were obtained, the yields being based upon the amounts of starting materials used:

1. Phenyl isobornyl ether (colorless, slightly viscous liquid having a boiling point of 151° C./10 millimeters and $n_D^{25}=1.5241$), 50 per cent.

2. p-Isobornylphenol (viscous liquid of boiling point 170-181° C./10 millimeters and $n_D^{25}=1.5453$; solidified on standing), 2 per cent.

The new products may be produced in any convenient manner. Although but two halogenated derivatives are mentioned in the examples the invention includes such compounds regardless of the nature of the halogen, its position, or the number of halogen substituents, and whether or not one or more other substituents are present in the molecule. Condensations of camphene or tricyclene with a phenol at a low temperature will give a higher yield than at a high temperature. However, the invention is not limited to products made by any method. It is defined in the appended claims.

This is a continuation in part of my application Serial No. 653,426, filed March 9, 1946, now Patent No. 2,537,636.

What I claim is:

1. Isobornyl aryl ethers of the formula

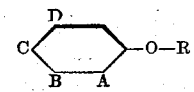

wherein A, B, C and D are radicals selected from the group consisting of hydrogen, a halogen, alkyl, hydroxy and alkoxy radicals, and R is isobornyl, no more than two halogen and alkyl groups are present, and no more than one alkoxy and hydroxy groups are present.
2. Isobornyl phenyl ether.
3. Isobornyl cresyl ethers.
4. Isobornyl p-tolyl ether.
5. Isobornyl 2,4-dimethylphenyl ether.
6. Isobornyl 2,4-dichlorophenyl ether.

LELAND J. KITCHEN.

REFERENCES CITED

The following references are of record in the file of this patent:

UNITED STATES PATENTS

| Number | Name | Date |
| --- | --- | --- |
| 1,469,709 | Wuyts | Oct. 2, 1923 |
| 2,145,369 | Osterhof | Jan. 31, 1939 |
| 2,186,132 | Zink | Jan. 9, 1940 |
| 2,213,477 | Steindorf | Sept. 3, 1940 |
| 2,320,846 | Borglin | June 1, 1943 |
| 2,488,489 | Borglin | Nov. 15, 1949 |

OTHER REFERENCES

Martin, "Paint Manufacturer," vol. 15 (1945), pages 30–32.